United States Patent
Suto

(10) Patent No.: US 11,137,852 B2
(45) Date of Patent: Oct. 5, 2021

(54) PRESSING OPERATION DETECTION DEVICE AND PRESSING OPERATION DETECTION METHOD

(71) Applicant: ALPINE ELECTRONICS, INC., Tokyo (JP)

(72) Inventor: Shunichi Suto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/896,666

(22) Filed: Jun. 9, 2020

(65) Prior Publication Data

US 2020/0387255 A1    Dec. 10, 2020

(30) Foreign Application Priority Data

Jun. 10, 2019 (JP) ............................ JP2019-108092

(51) Int. Cl.
*G06F 3/041* (2006.01)

(52) U.S. Cl.
CPC .. *G06F 3/0416* (2013.01); *G06F 2203/04105* (2013.01)

(58) Field of Classification Search
CPC .. G06F 3/0416; G06F 3/0488; G06F 3/04182; G06F 3/0414; G06F 3/0412; G06F 3/016; G06F 3/0486; G06F 3/044; G06F 3/0433; G06F 3/0418; G06F 3/041; G06F 3/04883; G06F 2203/04105; B60K 37/06; B60K 2370/1438
See application file for complete search history.

(56) References Cited

U.S. PATENT DOCUMENTS

2005/0110769 A1    5/2005  DaCosta et al.
2007/0097084 A1*   5/2007  Niijima .................. B60K 35/00
                                                      345/173
(Continued)

FOREIGN PATENT DOCUMENTS

JP    2012-181703    9/2012
JP    2018-005781    1/2018

OTHER PUBLICATIONS

Extended European Search Report for 20178599.5 dated Nov. 10, 2020, 8 pgs.

*Primary Examiner* — Ryan A Lubit
(74) *Attorney, Agent, or Firm* — Crowell & Moring LLP

(57) ABSTRACT

A pressing operation detection device includes a pressing operation determination unit determining whether a pressing operation has been performed based on a touch on an operation unit and a pressing amount, an increase-and-decrease frequency detection unit detecting occurrence frequency of increase and decrease of a pressing amount every predetermined period of time, and a determination controller changing content of the determination process of the pressing operation determination unit based on the occurrence frequency detected while a touch on the operation unit is not detected. When a pressing amount is detected although the operation unit is not touched, assuming that increase and decrease of the pressing amount is caused by vibration, content of the determination process is changed such that influence of the vibration is reduced so that detection of a pressing operation which brings a feeling of strangeness to the user which is caused by the vibration may be avoided.

16 Claims, 7 Drawing Sheets

(56) References Cited

U.S. PATENT DOCUMENTS

2012/0223900 A1* 9/2012 Jiyama ................. G06F 3/041
  345/173
2015/0301684 A1* 10/2015 Shimamura ......... G06F 3/04186
  345/174
2017/0336891 A1* 11/2017 Rosenberg ............ G06F 3/0421

* cited by examiner

PRESSING OPERATION DETECTION DEVICE AND PRESSING OPERATION DETECTION METHOD

RELATED APPLICATION

The present application claims priority to Japanese Patent Application Number 2019-108092, filed Jun. 10, 2019, the entirety of which is hereby incorporated by reference.

BACKGROUND

1. Field of the Invention

The present disclosure relates to a pressing operation detection device and a pressing operation detection method, and in particular, the present disclosure is suitably applied to a pressing operation detection device configured to detect a pressing operation in accordance with a touch on an operation unit and a pressing amount.

2. Description of the Related Art

In general, when a user operates a graphical user interface (GUI) displayed on a display including a touch panel, a pressing amount is detected in addition to a touch on the touch panel, and it is determined that the GUI has been pressed when the pressing amount exceeds a threshold value. Pressure applied when the user presses the touch panel is detected by a pressure detection sensor, and a pressing amount changed in accordance with the detected pressure is used for the determination as to whether a pressing operation has been performed, and accordingly, a reliable pressing operation may be obtained by the user.

In a case where a pressing detection structure including the touch panel and the pressure detection sensor is mounted on a vehicle, the pressure detection sensor may detect pressure caused by vibration of a vehicle depending on a configuration in which the pressure detection structure is disposed on a dashboard or the like. In a case where the user operates the touch panel while a pressing amount is detected based on the vibration, the pressing amount reaches a threshold value when the user lightly touches the touch panel, and therefore, it may be determined that a pressing operation has been performed.

In this case, a difference is generated between estimated pressure required for a pressing operation to be performed by the user and pressure actually applied by the time of detection of the pressing operation, and therefore a user feels strangeness. Note that the detection of the pressing operation is recognized by switching of display of a screen in accordance with the detection of the pressing operation performed on the GUI or by applying a touch feedback.

Note that devices configured to avoid false detection of a pressing operation caused by vibration have been generally used (refer to Japanese Unexamined Patent Application Publication Nos. 2012-181703 and 2018-5781, for example). In the apparatus disclosed in Japanese Unexamined Patent Application Publication No. 2012-181703, noise in a frequency component having a pressure value detected by a sensor is cut by a low pass filter (LPF) which attenuates a frequency band higher than a predetermined threshold value (a cutoff frequency) and calculates a pressed position based on a result of the cutoff of the high frequency band. Furthermore, according to Japanese Unexamined Patent Application Publication No. 2012-181703, when a peak of the pressure value detected by the sensor is equal to or larger than a predetermined upper limit threshold value or equal to or smaller than a predetermined lower limit threshold value or when a continuous time in which the voltage value is continuously detected is equal to or smaller than a predetermined threshold value, it is determined that a pressing operation is not performed by a person, and accordingly, a calculation of a pressed position based on the pressing value is not performed.

Furthermore, according to Japanese Unexamined Patent Application Publication No. 2018-5781, in an operation device including a base unit mounted on a vibration body, a touch pad including an operation surface supported on the base unit through an elastic body, and a load sensor detecting a movement on the operation surface, it is determined whether a load signal is generated by a touch operation on the operation surface or is transmitted from the vibrating body so that a touch operation is detected. Specifically, an amplitude value of the load signal is detected and the determination is made in accordance with attenuation of the amplitude value.

SUMMARY

The present disclosure is made to address the problem described above, and an object of the present disclosure is to avoid occurrence of detection of a pressing operation which brings a feeling of strangeness to the user which is caused by the vibration.

According to the present disclosure, a determination as to whether a pressing operation has been performed on an operation unit is made based on a result of a determination as to whether a touch on the operation unit performed by a user is detected and a result of a determination as to whether a pressing amount of pressing on the operation unit reaches a pressing amount threshold value. According to the present disclosure, before this determination is performed, frequency of increase and decrease of a pressing amount is detected every predetermined period of time, and content of a process of determining whether a pressing operation has been performed is changed based on the frequency of increase and decrease of a pressing amount detected in a state in which a touch on an operation unit is not detected.

When a pressing amount of pressing on the operation unit is detected although a touch on the operation unit is not detected, a detected increase and decrease of the pressing amount may be caused by vibration. According to an embodiment of the present invention configured as described above, content of the process of determining a pressing operation may be changed such that an adverse effect of the vibration is reduced in accordance with the frequency of increase and decrease of a pressing amount, and accordingly, detection of a pressing operation which brings a feeling of strangeness to the user which is caused by the vibration may be avoided.

DETAILED DESCRIPTION OF THE PREFERRED EMBODIMENTS

Figure 1:
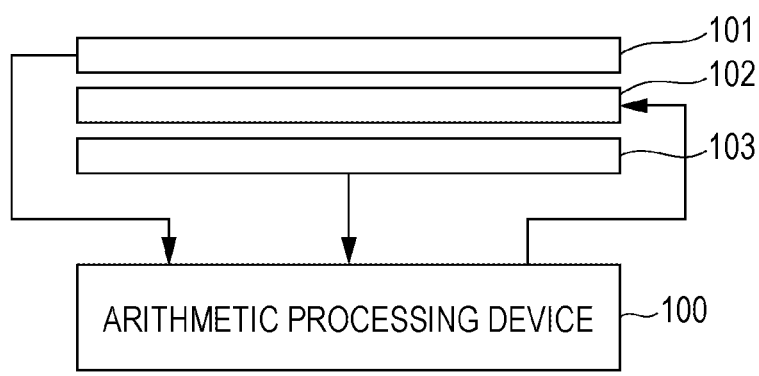
FIG. 1 is a diagram schematically illustrating an example of a configuration of an in-vehicle apparatus including a pressing operation detection device according to an embodiment.

Hereinafter, an embodiment of the present invention will be described with reference to the accompanying drawings. FIG. 1 is a diagram schematically illustrating an example of a configuration of an in-vehicle apparatus employing a pressing operation detection device according to this embodiment. As illustrated in FIG. 1, the in-vehicle apparatus includes an arithmetic processing device 100 including a pressing operation detection device according to this embodiment, a touch panel 101, a display panel 102, and a pressure detection sensor 103.

The touch panel 101 corresponding to an operation unit according to an aspect of the invention detects a position touched by a user in a vehicle and outputs touch position information indicating the touched position. The display panel 102 displays an image generated by the arithmetic processing device 100 and is constituted by a liquid crystal panel or an organic electroluminescence (EL) panel, for example. The pressure detection sensor 103 detects pressure applied when the user presses the touch panel 101 and outputs pressing amount information indicating a pressing amount changed in accordance with the pressure.

As illustrated in FIG. 1, the touch panel 101 is disposed on an uppermost layer, the display panel 102 is disposed on a layer beneath the touch panel 101, and the pressure detection sensor 103 is disposed on a layer beneath the display panel 102. When the user lightly touches a desired position on the touch panel 101, the touch panel 101 detects the touched position. Furthermore, when the user strongly touches (presses) a desired position on the touch panel 101, pressure of the touch is transmitted from the touch panel 101 through the display panel 102 to the pressure detection sensor 103 so that the touch panel 101 detects the touched position and the pressure detection sensor 103 detects the pressure (a pressing amount).

Note that configurations and arrangement of the touch panel 101, the display panel 102, and the pressure detection sensor 103 are merely examples and the present invention is not limited to these. For example, the display panel 102 may be configured slightly smaller than the touch panel 101 and the pressure detection sensor 103, and the touch panel 101 and the pressure detection sensor 103 may be coupled to each other outside the display panel 102 so that pressure of pressing on the touch panel 101 performed by the user is directly transmitted from the touch panel 101 to the pressure detection sensor 103 without using the display panel 102.

Information on the touched position detected by the touch panel 101 and information on the pressing amount detected by the pressure detection sensor 103 are supplied to the arithmetic processing device 100. The arithmetic processing device 100 determines whether a pressing operation has been performed based on the touch position information supplied from the touch panel 101 and the pressing amount information supplied from the pressure detection sensor 103, and executes a predetermined process in accordance with content of a GUI displayed in the touched position when determining that the pressing operation has been performed.

Figure 2:
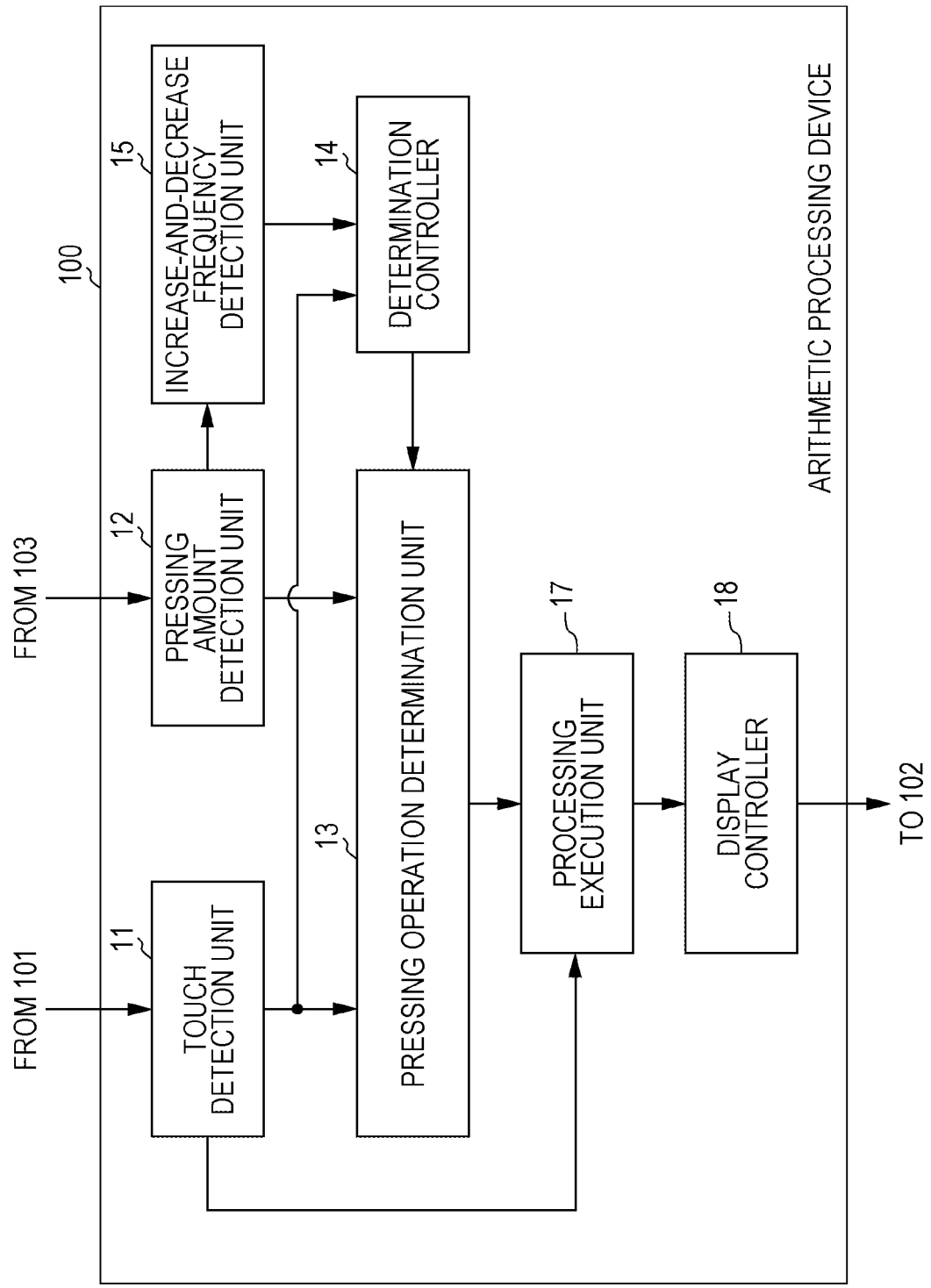
FIG. 2 is a block diagram illustrating an example of a functional configuration of an arithmetic processing device including the pressing operation detection device according to the embodiment.

FIG. 2 is a block diagram illustrating an example of a functional configuration of the arithmetic processing device 100 including the pressing operation detection device according to the embodiment. As illustrated in FIG. 2, the arithmetic processing device 100 according to this embodiment includes, as functional configurations thereof, a touch detection unit 11, a pressing amount detection unit 12, a pressing operation determination unit 13, a determination controller 14, an increase-and-decrease frequency detection unit 15, a processing execution unit 17, and a display controller 18. In these configurations, the touch detection unit 11, the pressing amount detection unit 12, the pressing operation determination unit 13, the determination controller 14, and the increase-and-decrease frequency detection unit 15 constitute the pressing operation detection device according to this embodiment.

The functional blocks 11 to 18 may be configured by hardware, a digital signal processor (DSP), or software. When each of the functional blocks 11 to 18 is configured by software, each of the functional blocks 11 to 18 includes a central processing unit (CPU), a random access memory (RAM), and a read only memory (ROM) of a computer in practice and is realized when a program stored in a recording medium, such as the RAM, the ROM, a hard disk, or a semiconductor memory, is operated.

The touch detection unit 11 detects a touch on the touch panel 101 performed by the user based on the touch position information supplied from the touch panel 101. Furthermore, the touch detection unit 11 also detects a touched position on the touch panel 101 based on the touch position information supplied from the touch panel 101. Information indicating that the touch panel 101 is touched or not touched is used by the pressing operation determination unit 13 and the determination controller 14, and information on the touched position is used by the processing execution unit 17.

The pressing amount detection unit 12 successively detects amounts of pressing on the touch panel 101 performed by the user based on the pressing amount information supplied from the pressure detection sensor 103. The information on the pressing amounts on the touch panel 101 is used by the pressing operation determination unit 13 and the increase-and-decrease frequency detection unit 15.

The pressing operation determination unit 13 determines whether a pressing operation has been performed on the touch panel 101 based on a touch performed on the touch panel 101 detected by the touch detection unit 11 and an amount of pressing on the touch panel 101 detected by the pressing amount detection unit 12. The term "pressing operation" includes, in addition to a light touch on the touch panel 101, an operation of strongly pressing the touch panel 101 until a threshold value of a pressing amount is reached. Specifically, the pressing operation determination unit 13 determines whether the pressing operation has been performed on the touch panel 101 based on detection of a touch on the touch panel 101 performed by the touch detection unit 11 and a result of a determination as to whether a pressing amount detected by the pressing amount detection unit 12 has reached a threshold value (hereinafter referred to as a "pressing amount threshold value").

The increase-and-decrease frequency detection unit 15 detects frequency of increase and decrease of a pressing amount detected by the pressing amount detection unit 12 every predetermined period of time. The term "increase and decrease of a pressing amount" indicates a state in which a pressing amount is increased and then decreased. The frequency indicates the number of times the increase and decrease of a pressing amount occurs in a certain period of time (five seconds, for example). The increase-and-decrease frequency detection unit 15 repeatedly detects the number of times increase and decrease of a pressing amount occurs in a certain period of time (occurrence frequency) every predetermined period of time. The occurrence frequency of increase and decrease of a pressing amount is detected to determine whether the increase and decrease of a pressing amount is caused by repeated vibration.

Note that the increase-and-decrease frequency detection unit 15 may detect a state in which a pressing amount is increased and then decreased as a single increase-and-decrease operation. However, a single increase-and-decrease operation may be defined as follows. For example, a threshold value may be set for detection of vibration, and when a pressing amount detected by the pressing amount detection unit 12 is changed from a value smaller than the threshold value for vibration detection to a value larger than the threshold value for vibration detection, it may be determined that a single increase-and-decrease operation has occurred. On the other hand, when a pressing amount detected by the pressing amount detection unit 12 is changed from a value larger than the threshold value for vibration detection to a value smaller than the threshold value for vibration detection, it may be determined that a single increase-and-decrease operation has occurred. In this way, since the threshold value for vibration detection is set so that the increase and decrease of a pressing amount is detected, occurrence frequency may be detected while increase and decrease of a change by a small value is ignored.

The determination controller 14 performs control such that content of a determination process performed by the pressing operation determination unit 13 is changed based on occurrence frequency of the increase and decrease of a pressing amount detected by the increase-and-decrease frequency detection unit 15 in a state in which a touch on the touch panel 101 is not detected by the touch detection unit 11. Specifically, the determination controller 14 determines whether occurrence frequency of the increase and decrease of a pressing amount detected by the increase-and-decrease frequency detection unit 15 is larger than a threshold value (hereinafter referred to as a "frequency threshold value") every predetermined period of time in a state in which the touch detection unit 11 does not detect a touch on the touch panel 101, and changes, in accordance with a result of the determination, the pressing amount threshold value to be used by the pressing operation determination unit 13 for a determination.

For example, the determination controller 14 changes the pressing amount threshold value set in the pressing operation determination unit 13 to be larger than a current value when the occurrence frequency of the increase and decrease of a pressing amount detected by the increase-and-decrease frequency detection unit 15 is larger than the frequency threshold value in a state in which the touch detection unit 11 does not detect a touch on the touch panel 101. An increase amount at this time is determined in advance. On the other hand, the determination controller 14 changes the pressing amount threshold value set in the pressing operation determination unit 13 to be smaller than a current value when the occurrence frequency of the increase and decrease of a pressing amount detected by the increase-and-decrease frequency detection unit 15 is not larger than the frequency threshold value in the state in which the touch detection unit 11 does not detect a touch on the touch panel 101. A decrease amount at this time is determined in advance. The determination controller 14 repeatedly performs this process every predetermined period of time. By this, the pressing amount threshold value set in the pressing operation determination unit 13 is dynamically changed every predetermined period of time.

In a case where the detected occurrence frequency of increase and decrease of a pressing operation is larger than the frequency threshold value although a touch on the touch panel 101 is not detected, it may be assumed that the user is not pressing the touch panel 101 but the pressure detection sensor 103 detects pressure which frequently increases and decreases due to vibration of the vehicle. In this case, the pressing amount threshold value set in the pressing operation determination unit 13 is changed to be larger than a current value so that false detection of detecting a pressing operation only by a pressing amount detected due to vibration and an erroneous determination that a pressing operation has been performed when the user only lightly touches the touch panel 101 are suppressed. On the other hand, when the detected occurrence frequency of increase and decrease of a pressing amount is not larger than the frequency threshold value, it may be estimated that influence of the vibration of the vehicle is negligible. In this case, the pressing amount threshold value set in the pressing operation determination unit 13 is changed to a value smaller than a current value so that the increased pressing amount threshold value is reduced close to an original value.

Here, a minimum value and a maximum value of the pressing amount threshold value which may be set in the pressing operation determination unit 13 are determined in advance. Therefore, after the pressing amount threshold value reaches the minimum value, the pressing amount threshold value is not reduced to a value smaller than the minimum value. Similarly, after the pressing amount threshold value reaches the maximum value, the pressing amount threshold value is not increased to a value larger than the maximum value. The maximum value is set to address a case where a pressing operation is not detected unless the user presses the touch panel 101 with a considerably strong power when the pressing amount threshold value is infinitely increased. The minimum value is set to address a case where a pressing operation is unintentionally detected when the user lightly touches the touch panel 101 in a state of no vibration when the pressing amount threshold value is infinitely reduced, and accordingly, a reliable pressing operation may not be obtained by the user. Note that an initial value of the pressing amount threshold value is set to the minimum value of the pressing amount threshold value, for example. Furthermore, the threshold value for vibration detection described above is set to be a value smaller than the minimum value of the pressing amount threshold value.

In a case where a frequency of generated vibration is high, even when the vibration is sporadic, a pressing amount detected by the pressing amount detection unit 12 is increased and decreased in a jiggly manner. Therefore, the occurrence frequency of increase and decrease detected by the increase-and-decrease frequency detection unit 15 may become larger than the frequency threshold value, and the pressing amount threshold value of the pressing operation determination unit 13 may be changed to a value larger than a current value. To avoid this, the increase-and-decrease frequency detection unit 15 may detect the occurrence frequency of increase and decrease by a process illustrated in FIGS. 3A and 3B.

Figure 3A:
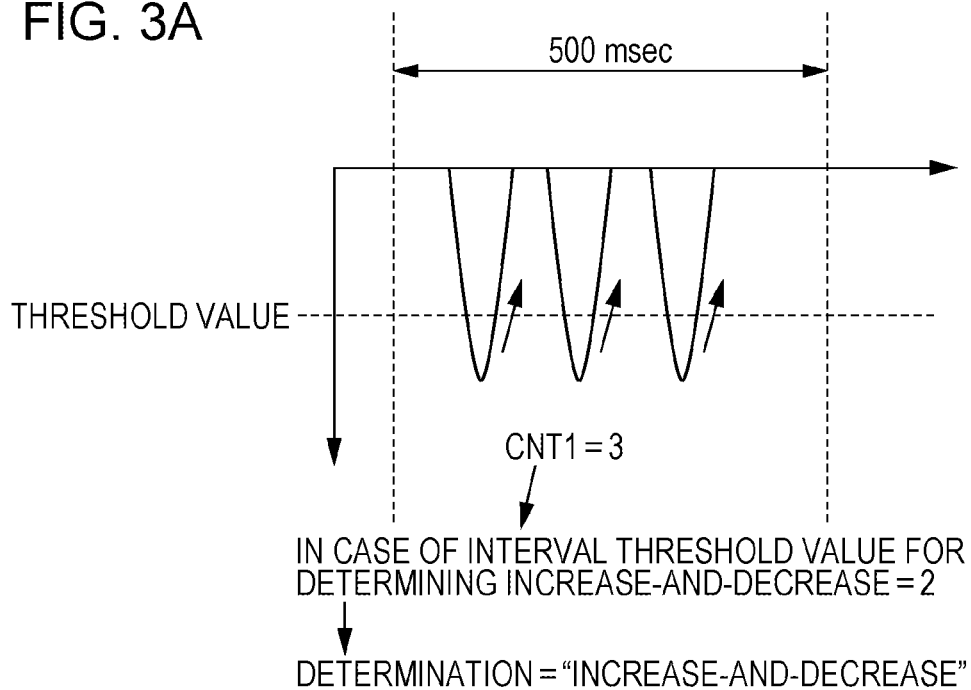
FIGS. 3A and 3B are diagrams schematically illustrating an example of an operation of an increase-and-decrease frequency detection unit according to the embodiment.

Specifically, the increase-and-decrease frequency detection unit 15 sets a plurality of divided intervals by dividing the certain period of time (five seconds, for example) described above as illustrated in FIG. 3B. For example, 10 divided intervals are set in the certain period of time while a length of one of the divided intervals is set to 500 milliseconds. FIG. 3A is a diagram illustrating one of the 10 divided intervals. The increase-and-decrease frequency detection unit 15 detects occurrence frequency of increase and decrease of a pressing amount for each divided interval as illustrated in FIG. 3A, and determines that increase and decrease has occurred when the occurrence frequency exceeds a threshold value (hereinafter referred to as an "interval threshold value" which is distinguished from the frequency threshold value described above).

Figure 3B:
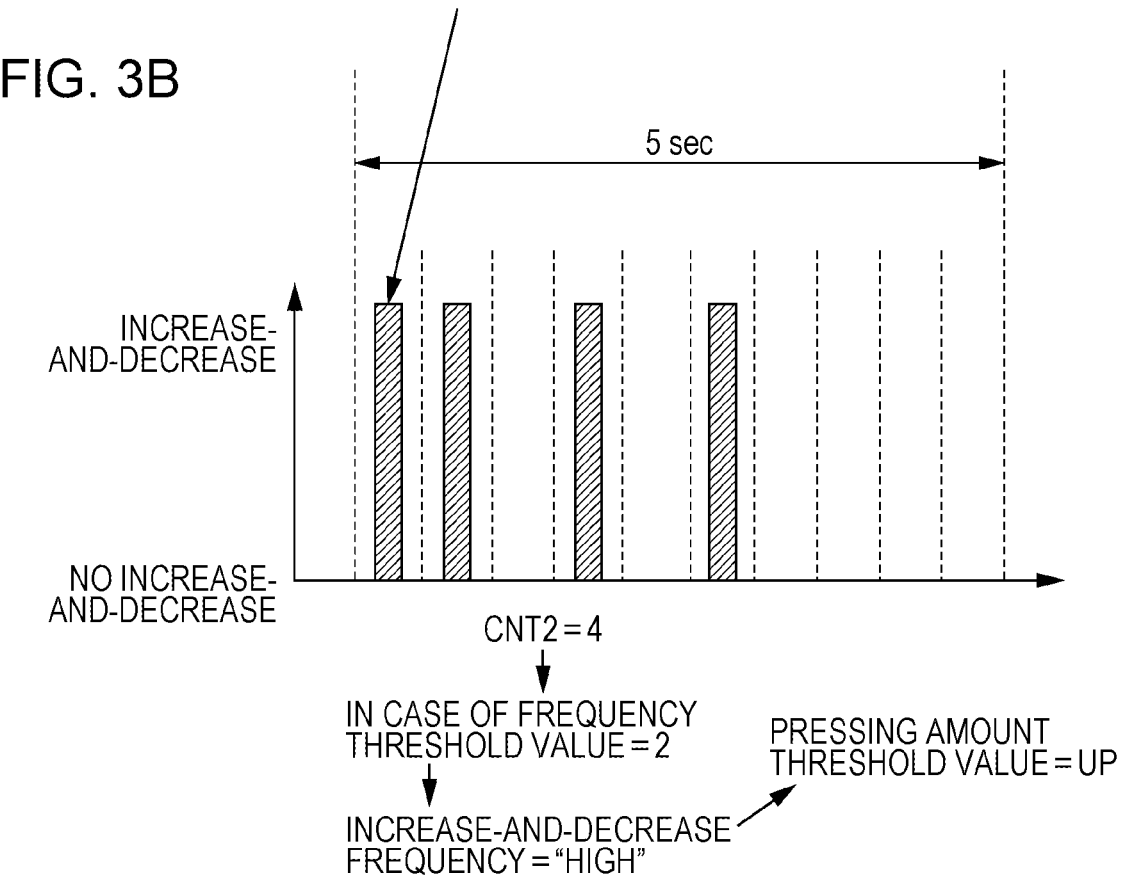

FIG. 3B is a diagram illustrating a result of a determination as to whether increase and decrease has occurred in each of the 10 divided intervals. Here, it is determined that the increase and decrease has occurred in four of the 10 divided intervals. The determination controller 14 changes the pressing amount threshold value to a value larger than a current value when the number of divided intervals for which it is determined that the increase and decrease has occurred exceeds the frequency threshold value as illustrated in FIG. 3B.

The pressing operation determination unit 13 operates as follows under control of the determination controller 14 described above. Specifically, the pressing operation determination unit 13 determines that a pressing operation has been performed on the touch panel 101 when the touch detection unit 11 detects a touch on the touch panel 101 and a pressing amount detected by the pressing amount detection unit 12 reaches the pressing amount threshold value which is dynamically changed as described above. On the other hand, when the touch detection unit 11 does not detect a touch on the touch panel 101 or when a pressing amount detected by the pressing amount detection unit 12 does not reach the pressing amount threshold value, the pressing operation determination unit 13 determines that a pressing operation has not been performed on the touch panel 101.

The processing execution unit 17 executes a predetermined process corresponding to a GUI displayed in a touched position on the touch panel 101 when the pressing operation determination unit 13 determines that a pressing operation has been performed on the touch panel 101. The display controller 18 performs control such that an image generated by the processing execution unit 17 is displayed on the display panel 102 based on a result of execution of the predetermined process performed by the processing execution unit 17. By this, an image displayed on the display panel 102 is changed in response to a pressing operation performed on the touch panel 102.

Figure 4:
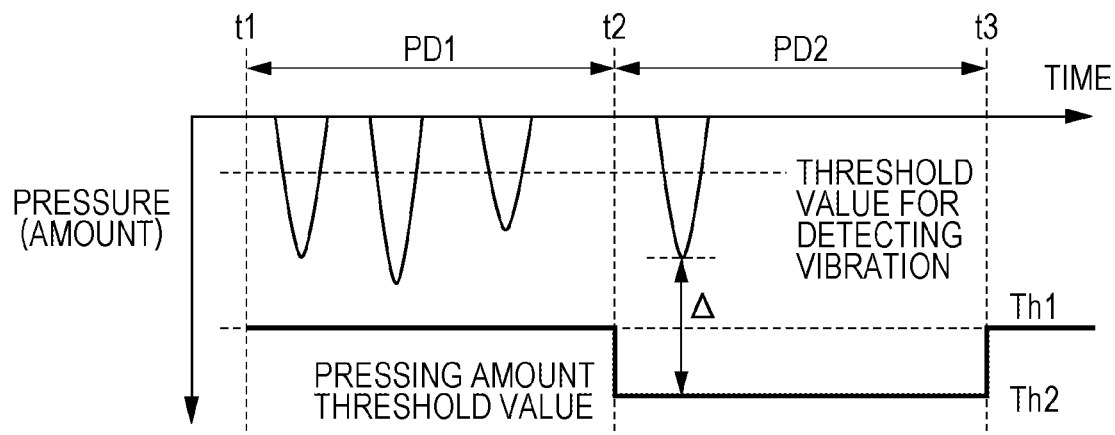
FIG. 4 is a diagram schematically illustrating an example of an operation of detecting a pressing operation performed by the pressing operation detection device according to the embodiment.

FIG. 4 is a diagram schematically illustrating an example of an operation of detecting a pressing operation performed by the pressing operation detection device according to this embodiment. In FIG. 4, an axis of abscissae denotes an elapsed time and an axis of ordinates denotes a pressing amount. In FIG. 4, an interval from a time point t1 to a time point t2 and an interval from the time point t2 to a time point t3 individually correspond to the certain period of time of five seconds. For simplicity of description, the former interval is referred to as a first period PD1 and the latter interval is referred to as a second period PD2. The certain period of time is repeated after the time point t3 in practice although not illustrated.

As illustrated in FIG. 4, in the first period PD1, the pressing amount threshold value is set to a first threshold value Th1. It is assumed that the first threshold value Th1 is an initial value (a minimum value which may be set as the pressing amount threshold value), for example. In the first period PD1, the increase and decrease occurs three times due to vibration in a pressing amount detected by the pressing amount detection unit 12. Here, assuming that the frequency threshold value is 2, the occurrence frequency of the increase and decrease exceeds the frequency threshold value, and therefore, the determination controller 14 changes the pressing amount threshold value of the pressing operation determination unit 13 to the second threshold value Th2 which is larger than the current value (the first threshold value Th1). By this, in the second period PD2 after the first period PD1, the pressing amount threshold value is set to the second threshold value Th2.

In the second period PD2, the increase and decrease occurs once due to the vibration in a pressing amount detected by the pressing amount detection unit 12. Since the number of times increase and decrease occurs in the second period PD2 is smaller than the frequency threshold value, the determination controller 14 changes the pressing amount threshold value of the pressing operation determination unit 13 to the first threshold value Th1 which is smaller than the current value (the second threshold value Th2). By this, in a third period PD3 (not illustrated) after the second period PD2, the pressing amount threshold value is set to the first threshold value Th1.

It is assumed that, in the second period PD2, the user operates the touch panel 101 at a timing of a peak of the increase and decrease of a pressing amount which occurs due to vibration. In this case, the pressing amount threshold value Th1 is increased to the pressing amount threshold value Th2, and therefore, the pressing operation determination unit 13 may not determine that a pressing operation has been performed unless the touch panel 101 is pressed by at least a pressing amount corresponding to a difference A between the peak of the increase and decrease and the pressing amount threshold value Th2. Accordingly, a difference between required pressure estimated by the user for a pressing operation and pressure actually applied until a pressing operation is detected is reduced, and accordingly, the user does not feel strangeness or the user feels less strangeness.

Figure 5:
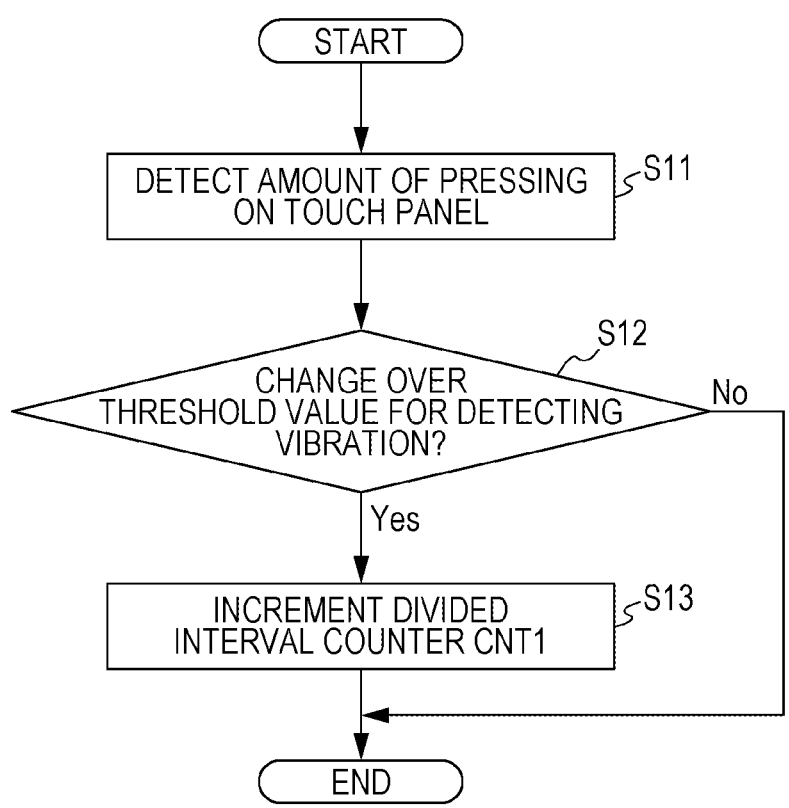
FIG. 5 is a flowchart of an example of an operation of the pressing operation detection device according to the embodiment.
Figure 6:
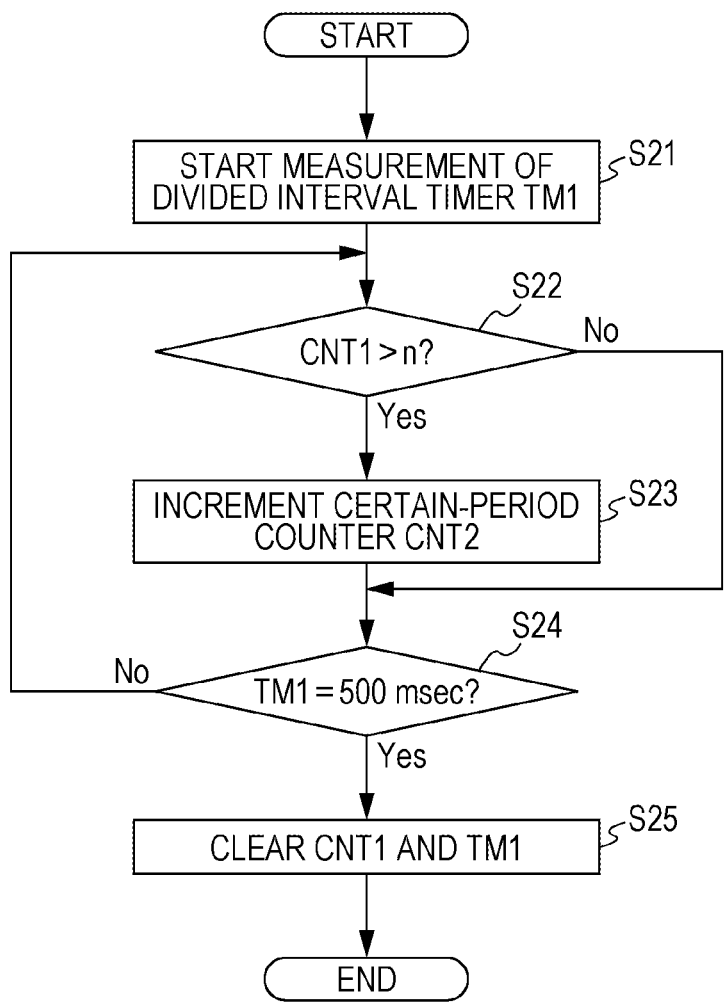
FIG. 6 is a flowchart of an example of an operation of the pressing operation detection device according to the embodiment.
Figure 7:
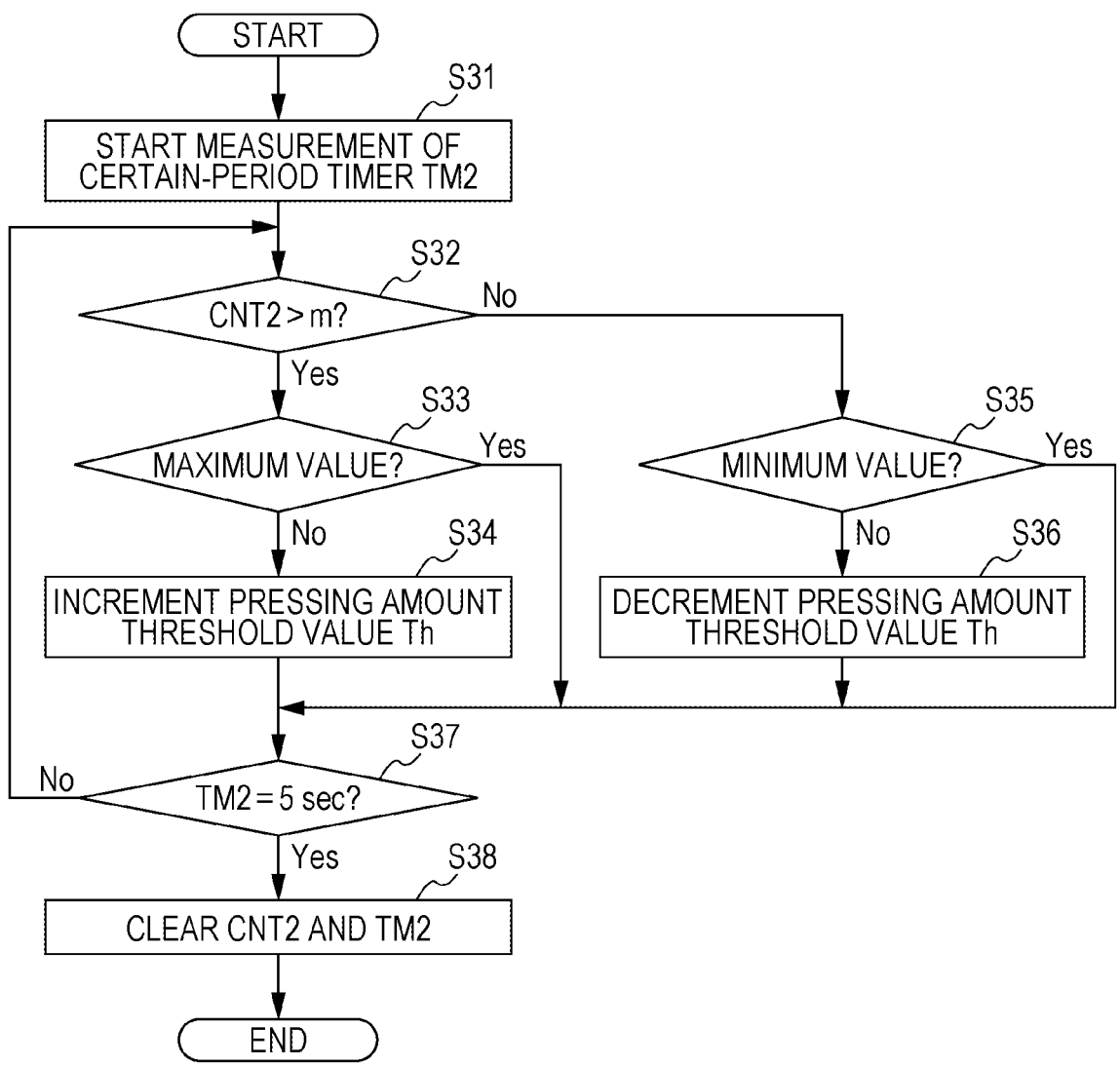
FIG. 7 is a flowchart of an example of an operation of the pressing operation detection device according to the embodiment.

FIGS. 5 to 7 are flowcharts of examples of operations performed by the pressing operation detection device configured as described above. FIGS. 5 and 6 are flowcharts of an example of a process of detecting "occurrence of increase and decrease" in the divided interval illustrated in FIG. 3A and an example of a process of detecting "frequency of increase and decrease" in the certain period of time illustrated in FIG. 3B, respectively. FIG. 7 is a diagram illustrating an example of a process of changing a pressing amount threshold value based on occurrence frequency of increase and decrease.

The flowchart of FIG. 5 is started when the in-vehicle apparatus is powered and constantly operates. The flowchart of FIG. 6 is started when the in-vehicle apparatus is powered and repeatedly performed every 500 milliseconds. The flowchart of FIG. 7 is started when the in-vehicle apparatus is powered and repeatedly performed every five seconds. Note that, in an initial state immediately after the in-vehicle apparatus is powered, the minimum value is set to a pressing amount threshold value of the pressing operation determination unit 13.

In FIG. 5, the pressing amount detection unit 12 detects a pressing amount of pressing on the touch panel 101 based on the pressing amount information supplied from the pressure detection sensor 103 (step S11). Then the increase-and-decrease frequency detection unit 15 determines whether the pressing amount detected by the pressing amount detection unit 12 is changed from a value larger than the threshold value for vibration detection to a value smaller than the threshold value for vibration detection (step S12).

Here, when the pressing amount is changed from the value larger than the threshold value for vibration detection to a value smaller than the threshold value for vibration detection, the increase-and-decrease frequency detection unit 15 increments a value of a counter (hereinafter referred to as a "divided interval counter CNT1") counting the number of times increase and decrease of a pressing amount occurs in a divided interval (step S13) and terminates a single process of the flowchart of FIG. 5. On the other hand, when a pressing amount is not changed from a value larger than the threshold value for vibration detection to a value smaller than the threshold value for vibration detection, the value of the divided interval counter CNT1 is not incremented and the single process of the flowchart in FIG. 5 is terminated.

In FIG. 6, first, the increase-and-decrease frequency detection unit 15 starts a timer (hereinafter referred to as a divided interval timer TM1) counting an elapsed time in the divided interval (step S21). Then the increase-and-decrease frequency detection unit 15 determines whether a value of the divided interval counter CNT1 is larger than an interval threshold value n (step S22).

When the value of the divided interval counter CNT1 is larger than the interval threshold value n, a value of a counter (hereinafter referred to as a certain-period counter CNT2) counting the number of times increase and decrease of a pressing amount occurs in the certain period of time (the number of divided intervals determined that increase and decrease has occurred) is incremented (step S23), and the process proceeds to step S24. On the other hand, when the value of the divided interval counter CNT1 is not larger than the interval threshold value n, the value of the certain-period counter CNT2 is not incremented, and the process proceeds to step S24.

In step S24, the increase-and-decrease frequency detection unit 15 determines whether the value of the divided interval timer TM1 reaches 500 milliseconds. When the value of the divided interval timer TM1 does not reach 500 milliseconds, the process returns to step S22. On the other hand, when the value of the divided interval timer TM1 reaches 500 milliseconds, the increase-and-decrease frequency detection unit 15 clears the value of the divided interval counter CNT1 and the value of the divided interval timer TM1 (step S25) and terminates the single process of the flowchart of FIG. 6.

In FIG. 7, the increase-and-decrease frequency detection unit 15 starts a timer (hereinafter referred to as a certain-period timer TM2) measuring an elapsed time of the certain period of time (step S31). Thereafter, the increase-and-decrease frequency detection unit 15 determines whether a value of the certain-period counter CNT2 is larger than a frequency threshold value m (step S32).

When the value of the certain-period counter CNT2 is larger than the frequency threshold value m, the increase-and-decrease frequency detection unit 15 determines whether a current value of the pressing amount threshold value Th set in the pressing operation determination unit 13 is the maximum value (step S33). When the current value is not the maximum value, the increase-and-decrease frequency detection unit 15 changes the pressing amount threshold value Th to a value larger than a current value (step S34). On the other hand, when the current value of the pressing amount threshold value is the maximum value, the process in step S34 is skipped and the current value (the maximum value) remains as the pressing amount threshold value Th.

In step S32, when it is determined that the value of the certain-period counter CNT2 is not larger than the frequency threshold value m, the increase-and-decrease frequency detection unit 15 determines whether a current value of the pressing amount threshold value Th set in the pressing operation determination unit 13 is the minimum value (an initial value) (step S35). When the current value is not the minimum value, the pressing amount threshold value Th is changed to a value smaller than the current value (step S36). On the other hand, when the current value of the pressing amount threshold value Th is the minimum value, the process in step S36 is skipped and the current value (the minimum value) remains as the pressing amount threshold value Th.

After the process in one of step S33 to step S36, the increase-and-decrease frequency detection unit 15 determines whether a value of the certain-period timer TM2 reaches five seconds. When the value of the certain-period timer TM2 does not reach five seconds, the process returns to step S32. On the other hand, when the value of the certain-period timer TM2 reaches five seconds, the increase-and-decrease frequency detection unit 15 clears the value of the certain-period counter CNT2 and the value of the certain-period timer TM2 (step S38), and the single process of the flowchart of FIG. 7 is terminated.

As described above in detail, in this embodiment, a determination as to whether a pressing operation has been performed on the touch panel 101 is made based on a result of a determination as to whether the user has touched the touch panel 101 and a result of a determination as to whether a pressing amount of the pressing on the touch panel 101 reaches the pressing amount threshold value. When the determination is performed, occurrence frequency of increase and decrease of a pressing amount is detected every certain period of time, and the pressing amount threshold value set in the pressing operation determination unit 13 is changed based on occurrence frequency of increase and decrease of a pressing amount detected in a state in which a touch on the touch panel 101 is not detected.

In the embodiment configured as described above, when a pressing amount of pressing on the touch panel 101 is detected although a touch on the touch panel 101 is not detected, increase and decrease of the detected pressing amount may be caused by vibration. By changing the pressing amount threshold value set in the pressing operation determination unit 13 in accordance with the occurrence frequency of increase and decrease, content of the process of determining whether a pressing operation has been performed may be changed such that influence of vibration is reduced. By this, an erroneous determination that a pressing operation has been performed which occurs when the user only lightly touches the touch panel 101 is avoided and a feeling of strangeness of the user may be reduced.

Note that the content of the control of the determination controller 14 described in the foregoing embodiment is merely an example, and the present invention is not limited to this. For example, the determination controller 14 may change content of the determination process performed by the pressing operation determination unit 13 such that, when the pressing amount threshold value set in the pressing operation determination unit 13 is equal to or larger than a predetermined value X (a value larger than the minimum value and smaller than the maximum value), a determination as to whether a period of time in which the pressing amount detected by the pressing amount detection unit 12 continuously reaches the pressing amount threshold value reaches a predetermined length instead of a determination as to whether the pressing amount detected by the pressing amount detection unit 12 reaches the pressing amount threshold value.

The case where the pressing amount threshold value set in the pressing operation determination unit 13 is equal to or larger than the predetermined value corresponds to a case where the predetermined period of time in which occurrence frequency of increase and decrease of a pressing amount exceeds the frequency threshold value is continued a number of times. This means a case where vibration is continued for a while. In this case, when the user presses the touch panel 101, it is highly likely that the user operates an unintentional portion due to the vibration. Therefore, in this case, the determination that a pressing operation has been performed is not made in accordance with a fact that a pressing amount on the touch panel 101 simply reaches the pressing amount threshold value but is made when a long press is performed on the touch panel 101 by a pressing amount which exceeds the pressing amount threshold value, and accordingly, a reliable pressing operation may be obtained by the user in an environment in which vibration is continued for a certain period of time.

As another example, the determination controller 14 may perform control such that the pressing operation determination unit 13 does not perform the determination process when the pressing amount threshold value set in the pressing operation determination unit 13 is equal to or larger than a predetermined value Y (a value which is larger than the minimum value and smaller than the maximum value). In this way, in a case where vibration is continued for a while, a process of determining as to whether a pressing operation has been performed is not performed by the pressing operation determination unit 13 so that an operation on an unintentional portion performed by the user due to the vibration is reliably avoided.

Note that, in this case, control may be performed such that the predetermined value Y (corresponding to a second predetermined value according to an aspect of the present disclosure) is larger than the predetermined value X and smaller than the maximum value, and in a case where the pressing amount threshold value set in the pressing operation determination unit 13 is equal to or larger than the predetermined value X and smaller than the predetermined value Y, it is determined that a pressing operation has been performed when a long press is applied on the touch panel 101 by a pressing amount which exceeds the pressing amount threshold value, and the pressing operation determination unit 13 does not perform the determination process when the pressing amount threshold value set in the pressing operation determination unit 13 is equal to or larger than the predetermined value Y.

Although the touch panel 101 is used as an example of an operation unit in the foregoing embodiment, the present invention is not limited to this. For example, a button of hardware which is mechanically configured may be used as the operation unit.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A pressing operation detection device including a touch detection unit detecting a touch on an operation unit by a user and a pressing amount detection unit detecting a pressing amount of pressing performed by the user on the operation unit, the pressing operation detection device comprising:
    a pressing operation determination unit configured to determine whether a pressing operation has been performed on the operation unit based on a result of a determination as to whether the touch detection unit detects the touch and a result of a determination as to whether the pressing amount detected by the pressing amount detection unit reaches a pressing amount threshold value;
    an increase-and-decrease frequency detection unit configured to detect occurrence frequency of increase and decrease of a pressing amount detected by the pressing amount detection unit every predetermined period of time; and
    a determination controller configured to perform control such that content of the determination process performed by the pressing operation determination unit is changed based on the occurrence frequency of increase and decrease of a pressing amount which is detected by the increase-and-decrease frequency detection unit in a state in which the touch detection unit does not detect a touch on the operation unit;
    wherein the determination controller determines whether the occurrence frequency of increase and decrease of a pressing amount detected by the increase-and-decrease frequency detection unit is larger than a frequency threshold value every predetermined period of time in a state in which the touch detection unit does not detect a touch on the operation unit, and changes the pressing amount threshold value used for the determination performed by the pressing operation determination unit in accordance with a result of the determination.

2. The pressing operation detection device according to claim 1, wherein the determination controller changes the pressing amount threshold value set in the pressing operation determination unit to a value larger than a current value when the occurrence frequency of increase and decrease of a pressing amount detected by the increase-and-decrease frequency detection unit is larger than the frequency threshold value and changes the pressing amount threshold value set in the pressing operation determination unit to a value smaller than the current value when the occurrence frequency of increase and decrease of the pressing amount detected by the increase-and-decrease detection unit is not larger than the frequency threshold value.

3. The pressing operation detection device according to claim 2, wherein the determination controller changes content of the determination process performed by the pressing operation determination unit such that a determination as to whether a continuous time in which the pressing amount detected by the pressing amount detection unit reaches the pressing amount threshold value reaches a predetermined length is made instead of the determination as to whether the pressing amount detected by the pressing amount detection unit reaches the pressing amount threshold value, when the pressing amount threshold value set in the pressing operation determination unit is equal to or larger than a predetermined value.

4. The pressing operation detection device according to claim 3, wherein the determination controller performs control such that the pressing operation determination unit does not perform the determination process when the pressing amount threshold value set in the pressing operation determination unit is equal to or larger than a second predetermined value which is larger than the predetermined value.

5. The pressing operation detection device according to claim 2, wherein the determination controller performs control such that the pressing operation determination unit does not perform the determination process when the pressing amount threshold value set in the pressing operation determination unit is equal to or larger than a predetermined value.

6. The pressing operation detection device according to claim 1, wherein the determination controller changes content of the determination process performed by the pressing operation determination unit based on a determination as to whether the pressing amount detected by the pressing amount detection unit reaches the pressing amount threshold value continuously for a predetermined length of time, when the pressing amount threshold value set in the pressing operation determination unit is equal to or larger than a predetermined value.

7. The pressing operation detection device according to claim 6, wherein the determination controller performs control such that the pressing operation determination unit does not perform the determination process when the pressing amount threshold value set in the pressing operation determination unit is equal to or larger than a second predetermined value which is larger than the predetermined value.

8. The pressing operation detection device according to claim 1, wherein the determination controller performs control such that the pressing operation determination unit does not perform the determination process when the pressing amount threshold value set in the pressing operation determination unit is equal to or larger than a predetermined value.

9. A pressing operation detection method employed in a pressing operation detection device which detects a touch on an operation unit performed by a user and a pressing amount of pressing performed by the user on the operation unit, the pressing operation detection method comprising:
   detecting a touch on the operation unit performed by the user using a touch detection unit included in the pressing operation detection device;
   detecting a pressing amount of pressing on the operation unit using a pressing amount detection unit included in the pressing operation detection device;
   detecting occurrence frequency of increase and decrease of a pressing amount detected by the pressing amount detection unit every predetermined period of time using an increase-and-decrease frequency detection unit included in the pressing operation detection device;
   performing control such that content of a determination process performed by a pressing operation determination unit is changed based on occurrence frequency of increase and decrease of a pressing amount detected by the increase-and-decrease frequency detection unit using a determination controller included in the pressing operation detection device in a state in which the touch detection unit does not detect a touch on the operation unit; and
   determining whether a pressing operation has been performed on the operation unit based on a result of detection of the touch performed by the touch detection unit and a result of a determination as to whether the pressing amount detected by the pressing amount detection unit reaches a pressing amount threshold value, in accordance with content of the determination process controlled by the determination controller, using the pressing operation determination unit included in the pressing operation detection device;
   wherein the determination controller determines whether the occurrence frequency of increase and decrease of a pressing amount detected by the increase-and-decrease frequency detection unit is larger than a frequency threshold value every predetermined period of time in a state in which the touch detection unit does not detect a touch on the operation unit, and changes the pressing amount threshold value used for the determination performed by the pressing operation determination unit in accordance with a result of the determination.

10. The pressing operation detection method according to claim 9, wherein the determination controller changes the pressing amount threshold value set in the pressing operation determination unit to a value larger than a current value when the occurrence frequency of increase and decrease of a pressing amount detected by the increase-and-decrease frequency detection unit is larger than the frequency threshold value and changes the pressing amount threshold value set in the pressing operation determination unit to a value smaller than the current value when the occurrence frequency of increase and decrease of the pressing amount detected by the increase-and-decrease detection unit is not larger than the frequency threshold value.

11. The pressing operation detection method according to claim 10, wherein the determination controller changes content of the determination process performed by the pressing operation determination unit such that a determination as to whether a continuous time in which the pressing amount detected by the pressing amount detection unit reaches the pressing amount threshold value reaches a predetermined length is made instead of the determination as to whether the pressing amount detected by the pressing amount detection unit reaches the pressing amount threshold value, when the pressing amount threshold value set in the pressing operation determination unit is equal to or larger than a predetermined value.

12. The pressing operation detection method according to claim 11, wherein the determination controller performs control such that the pressing operation determination unit does not perform the determination process when the pressing amount threshold value set in the pressing operation determination unit is equal to or larger than a second predetermined value which is larger than the predetermined value.

13. The pressing operation detection method according to claim 10, wherein the determination controller performs control such that the pressing operation determination unit does not perform the determination process when the pressing amount threshold value set in the pressing operation determination unit is equal to or larger than a predetermined value.

14. The pressing operation detection method according to claim 9, wherein the determination controller changes content of the determination process performed by the pressing operation determination unit based on a determination as to whether the pressing amount detected by the pressing amount detection unit reaches the pressing amount threshold value continuously for a predetermined length of time, when the pressing amount threshold value set in the pressing operation determination unit is equal to or larger than a predetermined value.

15. The pressing operation detection method according to claim 14, wherein the determination controller performs control such that the pressing operation determination unit does not perform the determination process when the pressing amount threshold value set in the pressing operation determination unit is equal to or larger than a second predetermined value which is larger than the predetermined value.

16. The pressing operation detection method according to claim 9, wherein the determination controller performs control such that the pressing operation determination unit does not perform the determination process when the pressing amount threshold value set in the pressing operation determination unit is equal to or larger than a predetermined value.

* * * * *